(12) United States Patent
Johnson

(10) Patent No.: US 10,005,619 B2
(45) Date of Patent: Jun. 26, 2018

(54) BELTLINE CLEANER

(71) Applicant: Meadow Power & Equipment Ltd., Meadow Lake (CA)

(72) Inventor: Troy Johnson, Meadow Lake (CA)

(73) Assignee: Saskatoon Material Handling Ltd., Saskatoon, Saskatchewan (CA)

( * ) Notice: Subject to any disclaimer, the term of this patent is extended or adjusted under 35 U.S.C. 154(b) by 0 days. days.

(21) Appl. No.: 15/087,373

(22) Filed: Mar. 31, 2016

(65) Prior Publication Data
US 2016/0355160 A1 Dec. 8, 2016

Related U.S. Application Data

(60) Provisional application No. 62/170,574, filed on Jun. 3, 2015.

(51) Int. Cl.
| B65G 33/32 | (2006.01) |
| B65G 33/26 | (2006.01) |
| B65G 45/20 | (2006.01) |

(52) U.S. Cl.
CPC ............ B65G 33/26 (2013.01); B65G 45/20 (2013.01)

(58) Field of Classification Search
CPC ..... B65G 33/10; B65G 41/002; B65G 41/005
USPC ............... 198/304, 312, 313, 317, 318, 668
See application file for complete search history.

(56) References Cited

U.S. PATENT DOCUMENTS

| 3,778,857 A * | 12/1973 | Hughes ................. A01K 5/01 15/4 |
| 4,312,540 A * | 1/1982 | Thompson ............. E21C 27/24 198/313 |
| 4,738,350 A * | 4/1988 | Miller .................. B65G 53/48 198/493 |

* cited by examiner

*Primary Examiner* — Gene O Crawford
*Assistant Examiner* — Lester Ill Rushin
(74) *Attorney, Agent, or Firm* — Patterson Thuente Pedersen, P.A.

(57) ABSTRACT

A clearing apparatus for removing bulk materials from an area with a low vertical clearance including an operator vehicle and an auger conveyor coupled to the operator vehicle. The auger conveyor is pivotable vertically in relation to the operator vehicle and rotatable substantially 90 degrees about a vertical axis of the auger conveyor, whereby the direction of rotation of the auger and the direction and pitch of the auger thread conveys material from the area with low vertical clearance toward the operator vehicle.

14 Claims, 13 Drawing Sheets

BELTLINE CLEANER

RELATED APPLICATIONS

This Application claims the benefit of U.S. Application No. 62/170,574, filed Jun. 3, 2015, said prior application being hereby fully incorporated by reference herein.

TECHNICAL FIELD

This invention is in the field of conveyance equipment cleaning devices, and more specifically to such devices used for cleaning up spillage off of bulk material handling conveyor belts.

BACKGROUND

A conveyor belt is used in many industries as a means of transporting material from one place to another and have been recognised as one of the most reliable and cost effective ways to move bulk materials because they have low energy requirements, low labour requirements, and low maintenance expenses per tonne of material transferred.

A typical conveyor belt system has two or more conveyor belts situated in an end-to-end configuration. Each conveyor belt usually has two or more pulleys or drums, with an endless loop of material that rotates about the pulleys and acts as a continuously-moving carrying surface. Usually one or both of the pulleys are powered to allow the belt to move forward, thus transporting the material sitting on top of the loop of material from one end of the conveyor belt to the other. If there is another conveyor belt situated end-to-end with the first conveyor belt, the transported material is conveyed along the first conveyor belt's load conveyancing section to a transfer point between the two conveyor belts, and then onto the load conveyancing section of the second conveyor belt.

The two main industrial classes of belt conveyors are those in general material handling and those in bulk material handling. General material handling would include the movement of cartons along a conveyor belt system across a factory floor. Bulk material handling conveyor belts are used to transport large volumes of resources and agricultural materials, such as grain, pulp and paper, fertilizer, potash, salt, coal, ore, sand, overburden and other particulates and materials. Bulk material handling conveyor belts are often used in confined spaces such as in coal-fired power plants, bulk shipping terminals, coal preparation plants, and where terrain is uneven, such as in underground mining and mineral (phosphate, potash, salt) mining. The material transferred along these conveyor belts is also sometimes difficult to handle due to corrosiveness of the material being transferred and/or due to particle size.

While belt conveyor systems remain one of the most reliable and affordable methods for moving bulk materials, spillage is a leading cause of loss in conveyor material handling systems. Material may spill over the sides of the carrying surface onto the ground below and can leak at transfer points where there is not an adequate seal between the conveyance surface of one belt with the conveyance surface of another belt. Material can also escape as dust from the material to be transferred due to impact forces present with all conveyor transferring systems, and can settle onto the floor of a plant or a mine. These so-called "fugitive materials" through spillage and dust act as losses of material and are a constant drain on the conveyor system. This loss of material, particularly at transfer points, can become very expensive over time and can present a variety of other problems to the system and those people operating it if not cleaned up regularly.

For example, spillage and dust from leaking transfer points can impact a conveyor line because escaped material can accumulate on conveyor components and cause severe damage. Idlers can fail when particulate materials clog or bury them, causing idler bearings to seize and damage the belt. Additionally, the malfunction of pulleys and idlers increases friction against the conveyor belt, which drains power at a much faster rate. When this type of damage is caused from fugitive materials, equipment may need to be prematurely replaced or repaired at a great financial expense and the need to turn off the system to replace or repair the equipment can result in significant costs in terms of production time and labor. The spillage of material could additionally produce build up beneath the conveyor belts, which, if the piles of material get large enough, can contact and begin to exert an upward pressure on the conveyor belt, disrupting the conveyancing line to cause even more spillage or even cause damage to the system through carryback and the like, or could even cause punctures on the belt itself. The additional friction of the pile of material touching the rubber belt when it accumulates can affect drive motor efficiencies as well. It is thus important to clean up any spillage of material before too much accumulates in order to avoid costly conveyor maintenance.

Allowing spilled material to sit in piles under the conveyor belt system can also be a health risk, as the material can add to the airborne dust in confined spaces, which in turn can cause issues for workers who are exposed to it for extended periods of time. In addition, a concentrated amount of dust in confined spaces can cause explosions that are both dangerous and expensive to deal with in the aftermath. The failure to clean up spillage around conveyor belts can also result in piles of loose materials underfoot, causing slips and fall accidents. These industrial accidents are an expensive burden. The proper management of spillage from conveyor belts is thus important not only from a financial cost perspective, but also for reducing workplace injury.

The costs associated with material spillage include loss of conveyed material, premature conveyor system replacement costs, workplace hazards, downtime loss of production costs, and damage to surrounding conveyor structure. It would be advantageous to address some of these costs and reduce the workplace hazards associated with accumulation of material beneath conveyor belts.

However, because conveyor belts are often situated on uneven terrain, in confined spaces, and are situated low to the ground, it can be difficult to maneuver under the conveyor belts to remove accumulated material. Previous attempts to do so manually with shovels have been costly and very labour intensive, as well as posing a risk to personnel safety or else the conveyor needs to be shut down while this is done, resulting in downtime. Since conveyor belt frames are often awkward to work around with low ground clearance, access underneath the conveyor belts can be prohibitive to the use of clumsy and traditional skid steer loaders and similar equipment. Cleaning out fugitive material with water hoses is typically not acceptable, as oftentimes the material to be handled can pose dangers to the equipment and personnel when wet. Plows have sometimes been used to clear out the area under conveyor belts, but again low clearance of the conveyor belts and the cumbersome size and upward and downward movements of the plow make maneuvering beneath the uneven terrain of a conveyor belt difficult. Another attempt at clearing out the area below a conveyor belt involves the use of vacuum technology whereby a vacuum head is used to suck material out from beneath the belt. However, when material accumulates beneath a belt, often the weight of the material causes solid heaves or dried, hard masses to form which can be difficult to break. Vacuum technology is unable to address the removal of these heaves and blockages.

It would be advantageous to have a device that cleans up spillage and buildup under conveyor belts and other tight, hazardous areas where removal of material is required and where conventional use of a shovel, hosing and other conventional material clearing devices is not possible. Such a device could help avoid costs associated with repairs, reduced belt efficiency, downtime, additional labour, and workplace hazards.

SUMMARY

It would be advantageous to have a beltline cleaner that can be used to clean out excessive build-up of fugitive bulk material under conveyor belts.

In an aspect a clearing apparatus for removing bulk materials from an area with a low vertical clearance comprises an operator vehicle and an auger conveyor coupled to the operator vehicle, the auger conveyor pivotable vertically in relation to the operator vehicle and rotatable substantially 90 degrees about a vertical axis of the auger conveyor, whereby the direction of rotation of the auger and the direction and pitch of the auger thread conveys material from the area with low vertical clearance toward the operator vehicle.

In another aspect a method of removing bulk materials from a surface area with a low vertical clearance comprises the steps of raising an auger conveyor in at least one direction upward and downward, moving the auger conveyor over the surface area by operating the operator vehicle in a rearward direction, and rotating the auger conveyor to cause movement of the materials from the surface area to an area in front of the operator vehicle.

The present invention can address heaves or hard buildup under beltlines, can effectively maneuver under low conveyor sections and other inaccessible places to remove spillage and blockages without any risk to workers or equipment, and does not require the conveyor belt system to be shut down while in use.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
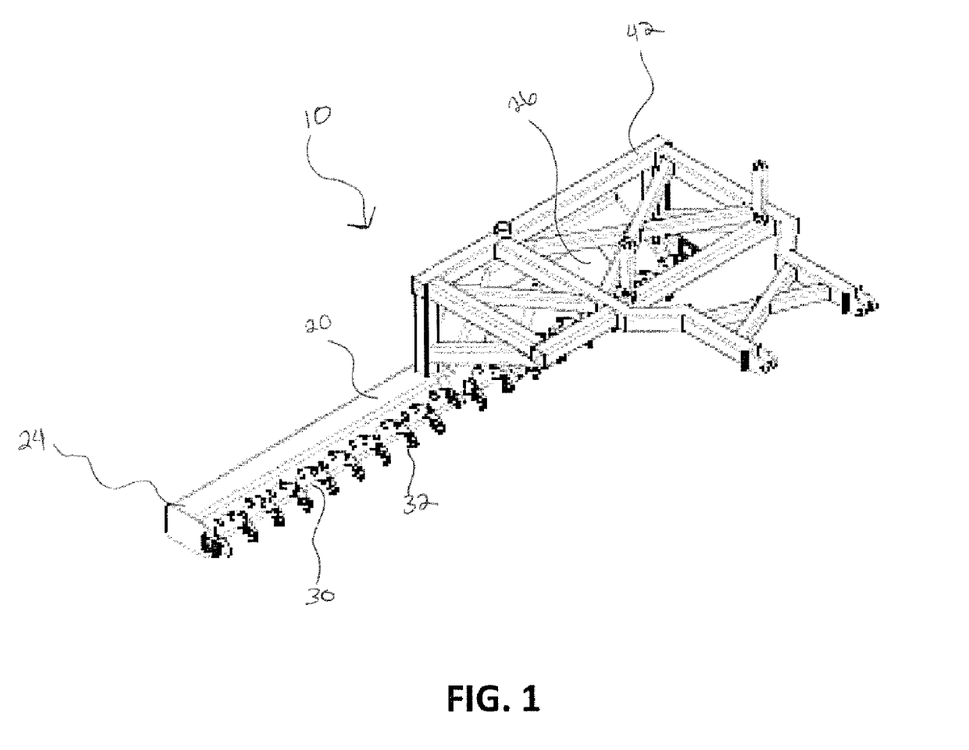
FIG. 1 is a perspective view of an auger attachment for a beltline cleaner in an aspect.
Figure 2:
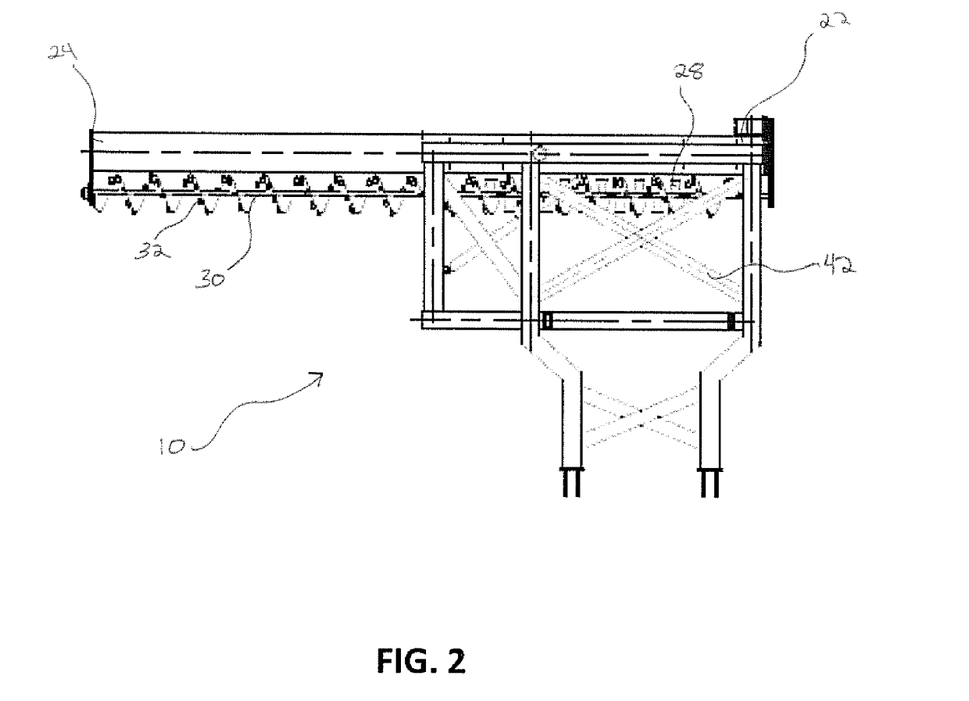
FIG. 2 is a top plan view of the auger attachment shown in FIG. 1.
Figure 3:
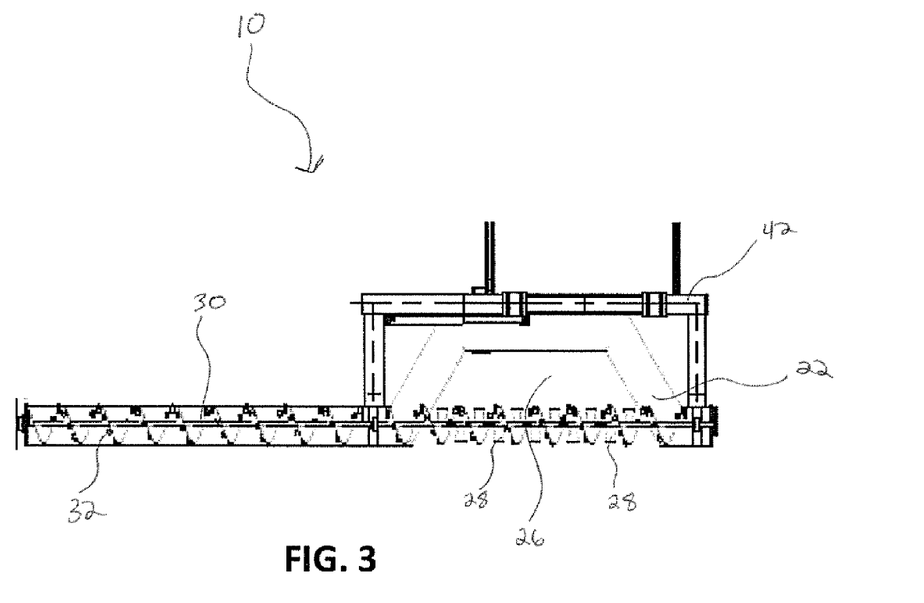
FIG. 3 is a rear elevation view of the auger attachment shown in FIG. 1.

A bulk material beltline cleaner is provided. The beltline cleaner has a horizontally-extending auger that is both pivotable vertically and rotatable horizontally about a vertical axis, allowing for control and maneuverability in tight, hazardous areas where removal of material is required, particularly in spaces having a low vertical clearance such as under conveyor beltlines. FIGS. 1 to 3 illustrate an auger attachment 10 for a beltline cleaner apparatus in an aspect. Auger attachment 10 has a beam 20 having a proximal end 22 and a distal end 24. Beam 20 is made out of any sufficiently strong and durable material, such as stainless steel, so as to provide strong structural support for auger attachment 10. The portion of the beam 20 from the proximal end 22 of the beam 20 to the center point of the beam 20 has an average upward radius of curvature to leave an opening 26 between the beam 20 and the ground adjacent the proximal end 22 of beam 20 when the distal end 24 of the beam 20 is substantially flush with the ground. In the aspect shown, the beam 20 is bent or arched upward adjacent the proximal end 22 to leave opening 26, though in other aspects the beam 20 could be curved upward adjacent the proximal end 22.

Figure 4:
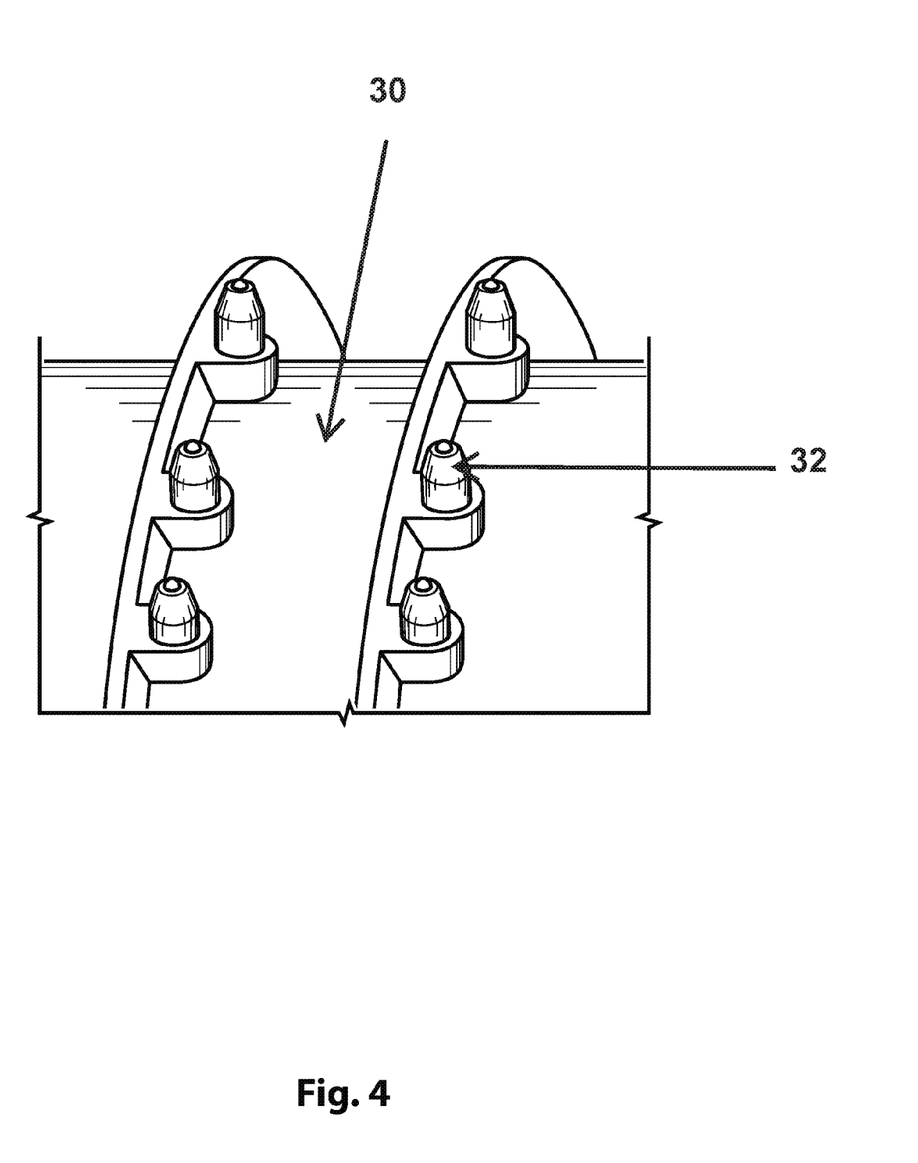
FIG. 4 is a close up view of the blades of the auger attachment shown in FIG. 1.
Figure 5:
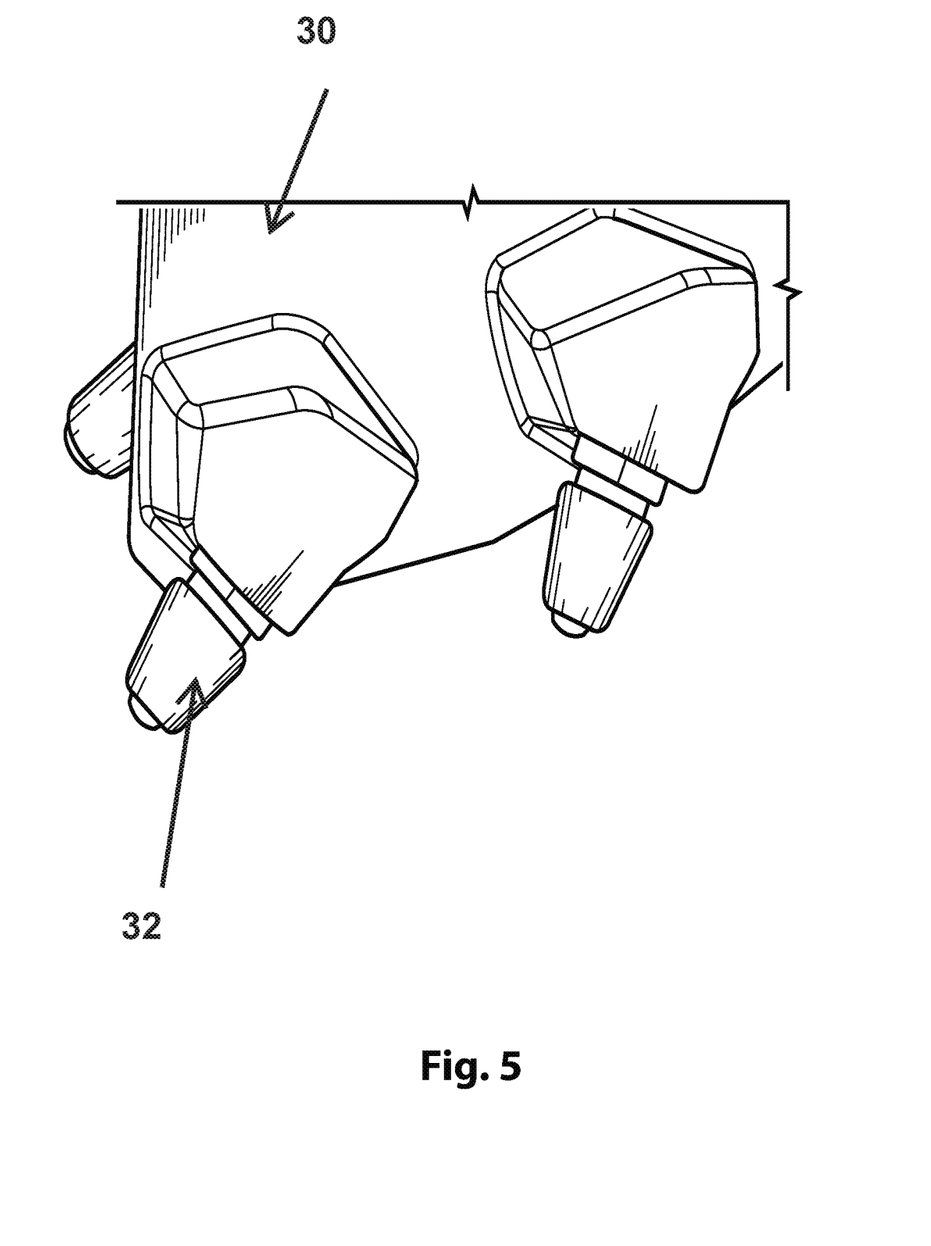
FIG. 5 is a side view of the bullets on the blades shown in FIG. 4.
Figure 6:
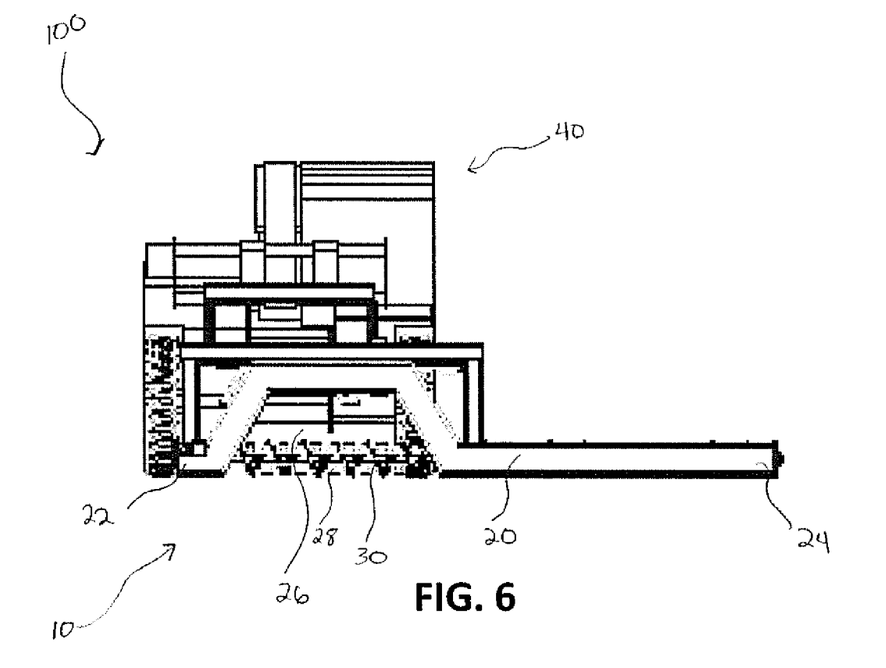
FIG. 6 is a front elevation view of a beltline cleaner in an aspect comprising the auger attachment shown in FIG. 1 attached to a telescopic handler.
Figure 7:
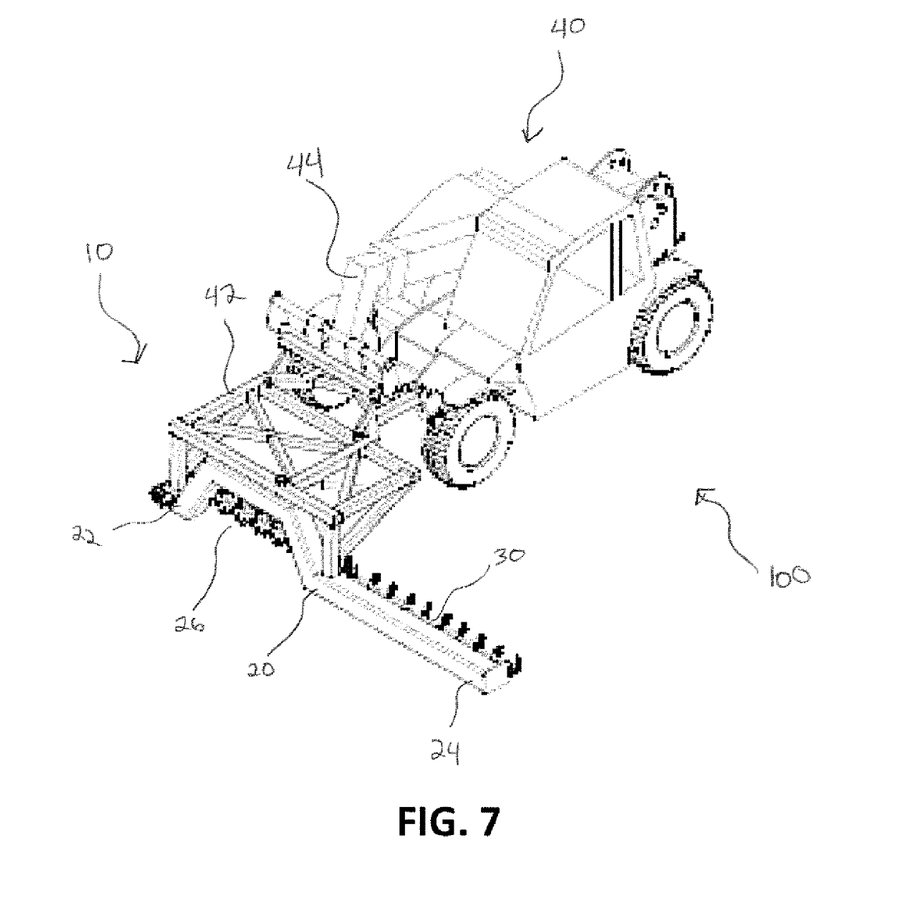
FIG. 7 is a front perspective view of the beltline cleaner shown in FIG. 6.
Figure 8:
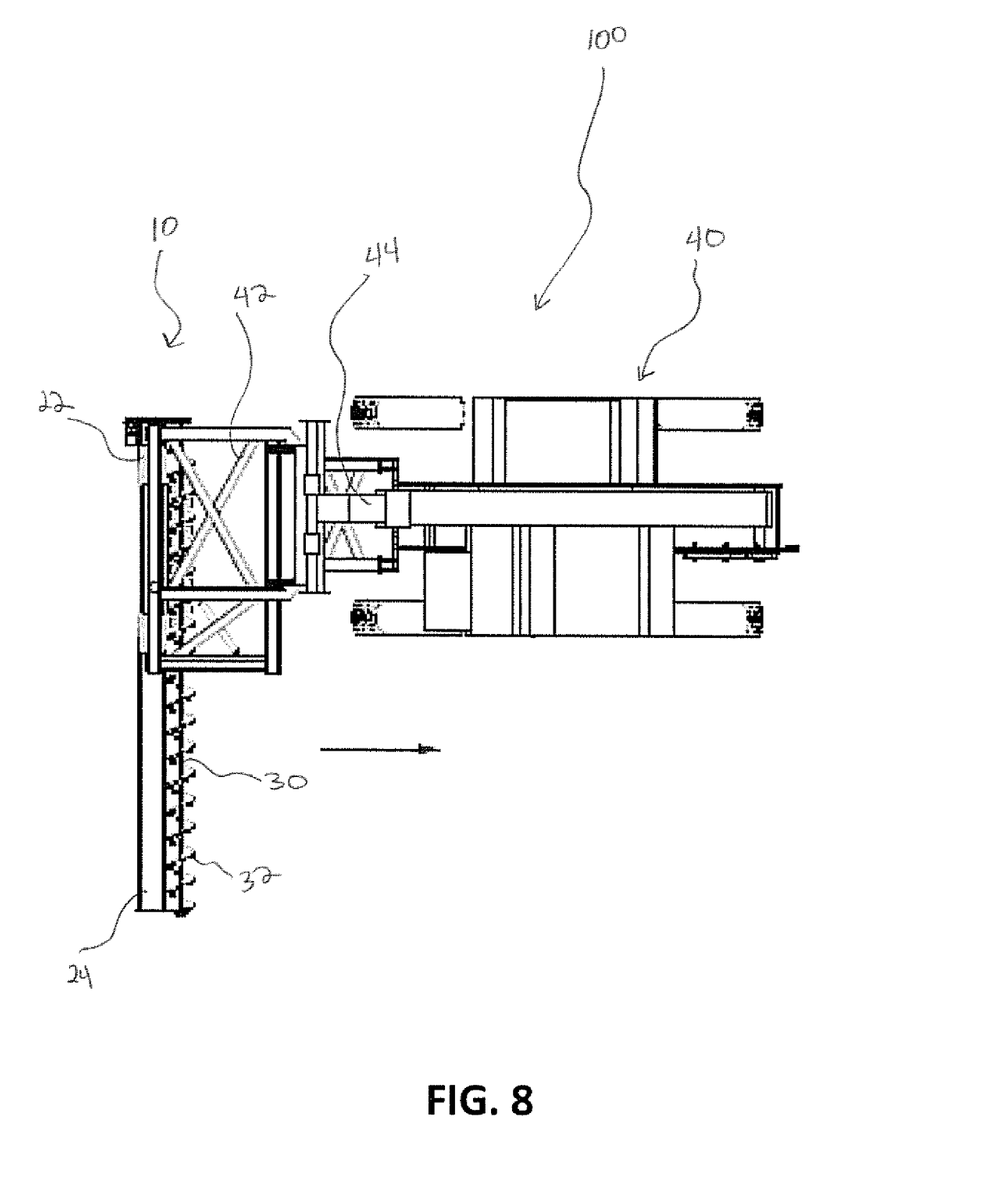
FIG. 8 is a top plan view of the beltline cleaner shown in FIG. 6.
Figure 9:
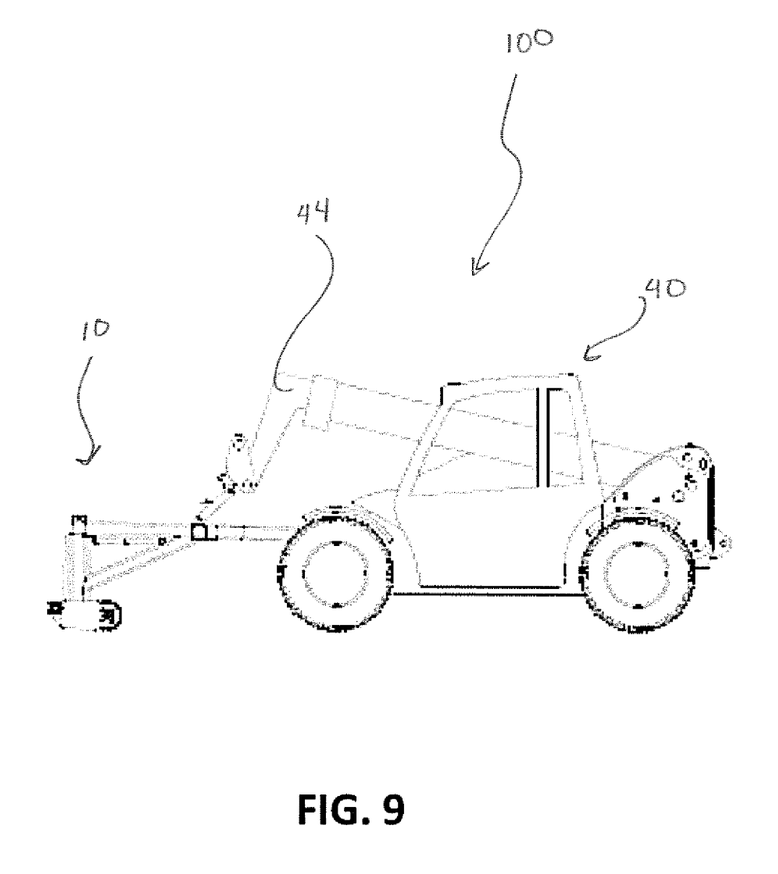
FIG. 9 is a side elevation view of the beltline cleaner shown in FIG. 6.
Figure 10:
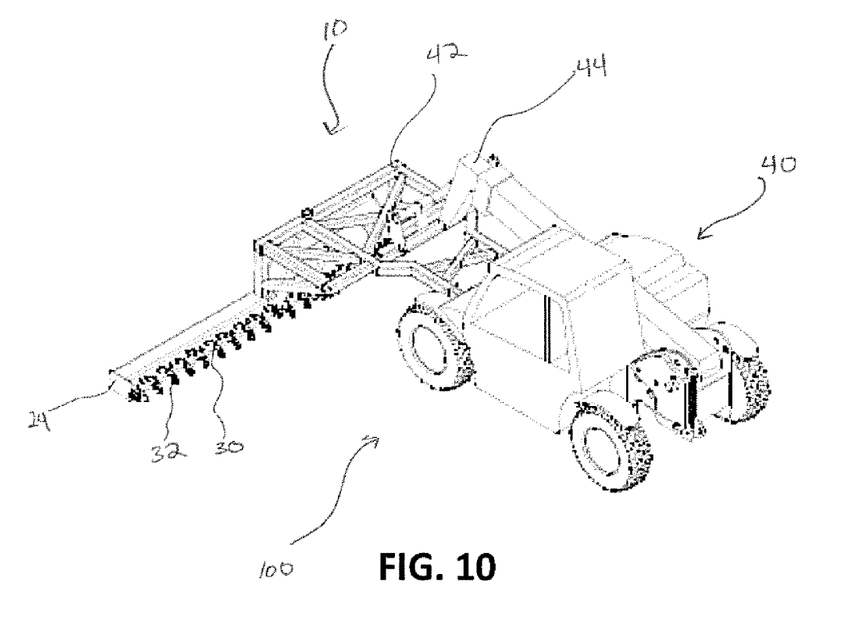
FIG. 10 is a rear perspective view of the beltline cleaner shown in FIG. 6.

The beam 20 is connected to an auger conveyor or rotating helical screw blade 30. Auger 30 is operatively connected to a drive motor to allow the auger 30 to rotate. Such drive motor can be disposed on the auger attachment 10 adjacent the proximal end 22. The auger 30 uses its fighting and the rotational motion provided by the motor to move materials, such as those materials found in the bulk handling industries. The auger 30 may be driven by the motor at the beam's proximal end 22 and may be connected to and supported by the beam's distal end 24. As shown in FIGS. 4 and 5, the auger 30 may in some aspects have projections 32 along its length adjacent the distal end 22. These projections 32 could be bullets on a portion of the auger fighting that can break apart or loosen heaves and hardened mounds of compacted material as the auger 30 rotates. These projections 32 could be made of a sufficiently tough and anti-corrosive material so as to be able to effectively disturb hardened material to be moved as well as to withstand constant friction and corrosive materials such as potash. In some aspects the projections 32 are made out of carbide and in other aspects, the projections 32 are carbide-tipped.

Referring again to FIGS. 1 to 3, the auger attachment 10 comprising the beam 20 and the auger 30 is configured to allow the distal end 24 to be inserted into an area with low vertical clearance, such as the area below a conveyor belt, and to allow the auger 30 to rotate and capture material from the area at its distal end 24 and convey it along its axis of rotation for discharging at the proximal end 22 of the auger attachment 10 behind the proximal end 22 of the auger attachment 10. The direction of rotation of the auger 30 and the direction and pitch of the auger thread or fighting can be selected so that the material removed from the surface area to be cleared is conveyed toward the proximal end 22 of the beam 20. Paddles 28 on the auger 30 adjacent the proximal end 22 of the beam 20 can sweep the materials conveyed to the space behind the proximal end 22 of the auger attachment 10 through the clearance or opening 26 provided by the average upward curvature in the beam 20 out in front of the auger attachment 10.

The material to be conveyed could be any type of bulk handling material, such as salt or potash fines. Since potash is mildly corrosive and abrasive, it can be difficult to handle so material handling equipment in this field must be heavy duty. The auger attachment 10 can be tailored to support handling of various materials. As an example, potash-based customization of the auger attachment 10 could have the high-wear areas such as the auger attachment 10 constructed out of various alloys to defend against corrosion and other issues associated with handling abrasive materials, and as a more specific example, the beam 20 and auger 30 could be constructed out of stainless steel. Additionally, carbide bullet projections 26 on the outside edge of the auger 30 could enable the auger attachment 10 to function in the presence of chunks of potash as well as incidental contact with floor heaves or other solid obstacles that may be encountered below a conveyor beltline in a mine or plant.

Referring now to FIGS. 6 to 10, a beltline cleaner apparatus 100 has the auger attachment 10 coupled to an operator vehicle 40. While in the figures, the beam 20 is shown as being coupled indirectly to the operator vehicle 40 through a frame 42 that can provide additional structural strength, stability, and/or support to the auger attachment 10, the beam could in alternative embodiments be directly coupled to the operator vehicle through, for example, a bracket fixed to the beam by welding or bolting. In the aspect shown, the frame 42 supports the proximal end 22 of the beam 20, with the distal end 24 of the beam 20 being substantially unsupported because the frame 42 is attached at a position offset from the longitudinal center of the beam 20, closer to the proximal end 22 end of the beam 20. However, in some embodiments, additional angle brackets or other support could be provided to hold the beam 20 in a stationary and more supported position.

In the aspect shown, operator vehicle 40 has a drive means and a boom 44 extending in a forward direction of the operator vehicle 40. The boom 44 is pivotable upward and downward, thus allowing the coupled auger attachment 10 to likewise pivot upward and downward upon operation of the boom 44. In the embodiment shown, the operator vehicle 40 is a telescopic handler with a telescopic boom 44, but in other aspects could be a front-end loader, skid steer, forklift, or a wheel loader, or any other vehicle able to engage the auger attachment 10, and to lift and lower the same. The operator vehicle 40 can pivot the boom 44 through any known drive means such as hydraulic or electrical drive means. In some aspects, the boom 44 can be pivoted through the vehicle 40's own hydraulic system.

Figure 11:
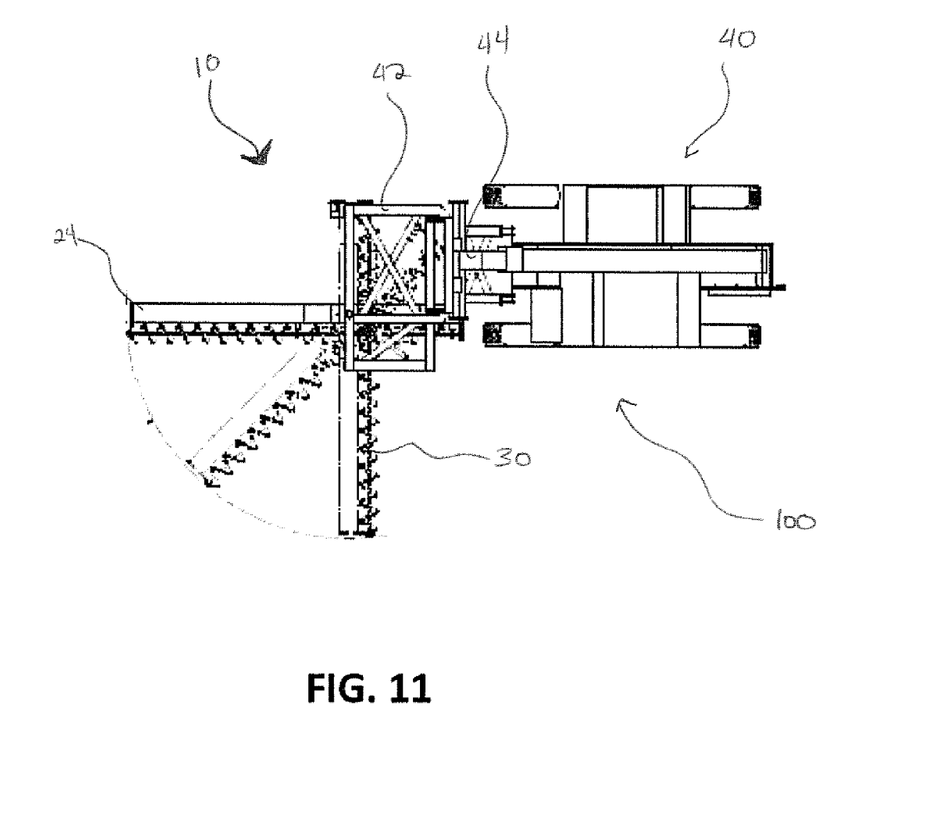
FIG. 11 is a top plan view of the beltline cleaner shown in FIG. 6 in operation rotating the auger horizontally.
Figure 12:
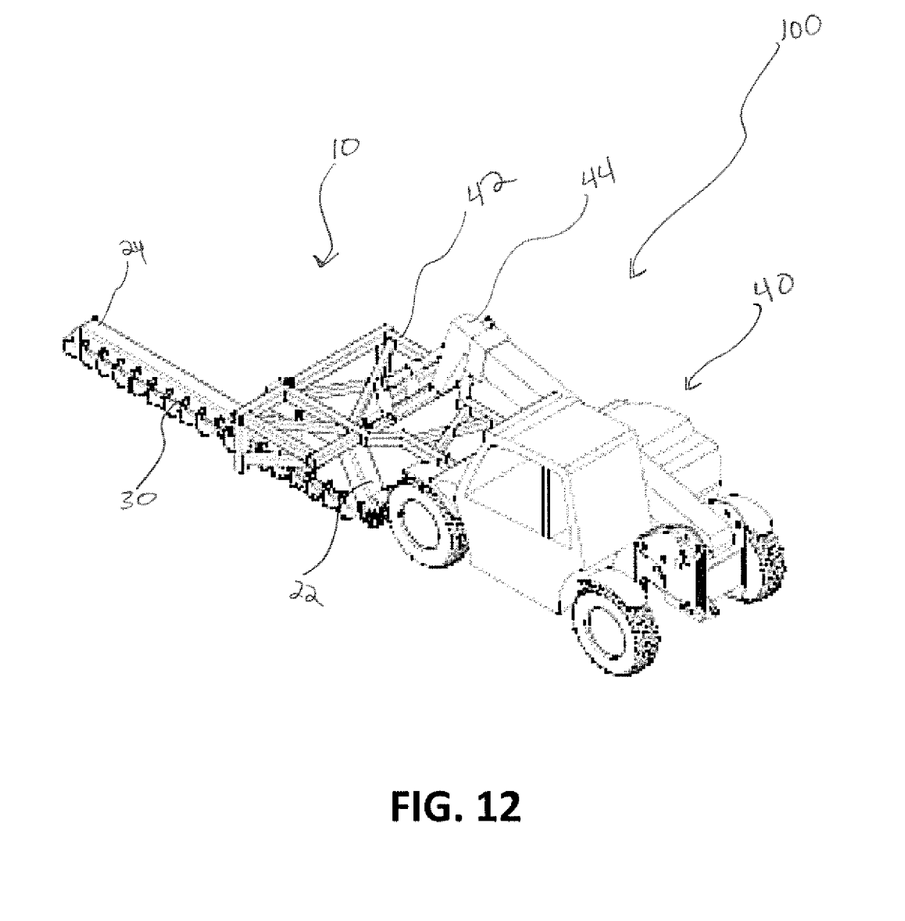
FIG. 12 is a perspective view of the beltline cleaner shown in FIG. 6 with the auger in a parallel position with the telescopic handler.
Figure 13:
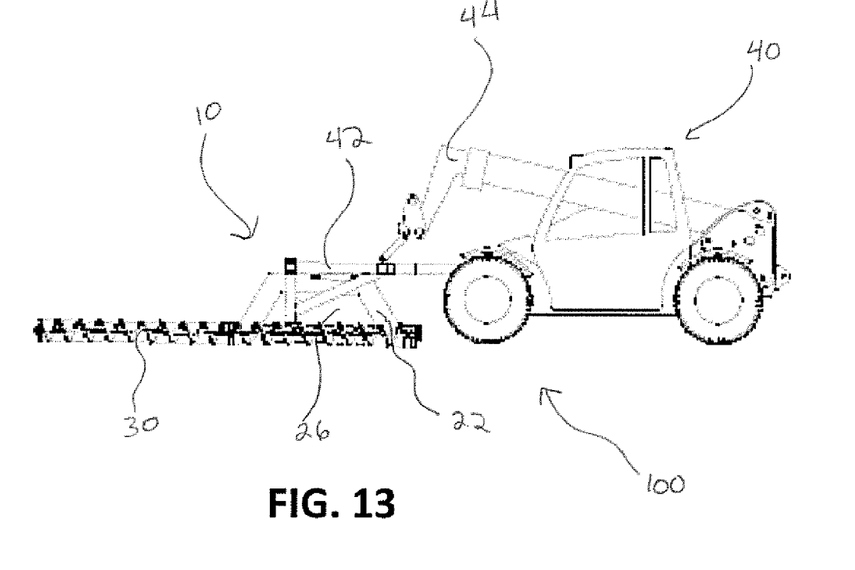
FIG. 13 is a side elevation view of the beltline cleaner shown in FIG. 6 with the auger in a parallel position with the telescopic handler.

FIGS. 11 to 13 show the beltline cleaner apparatus 100 in a further aspect where the auger attachment 10 can rotate about a vertical axis relative to the frame 42 and vehicle 40. In this aspect, a coupling connects the auger 30 and beam 20 to the frame 42 and is configured to allow the auger 30 and beam 20 to rotate substantially 90 degrees about a vertical axis relative to the frame 42. The rotation of the auger attachment 10 relative to the frame 42 could be controlled by the operator of the vehicle 40. The auger attachment 10 in FIGS. 6 to 10 show the attachment 10 in a position substantially perpendicular to the frame 42 and vehicle 40. FIG. 11 shows the attachment 10 moving from its perpendicular position to a position substantially parallel to the frame 42 and the vehicle 40. As can be seen, the pivot point of the auger attachment 10 on the frame 42 leaves sufficient horizontal clearance for the proximal end 22 of the beam 20 to rotate toward the vehicle 40 under the frame 42. The distal end 24 of the beam 20 swings outwardly approximately 90 degrees relative to the longitudinal axis of the operator vehicle 40 to a position whereby the beam 20 is substantially parallel to the vehicle 40.

The rotation of the auger 30 and the horizontal rotation of the auger attachment 10 about a vertical axis can be provided by known drive means of suitable power to rotate the auger 30 or the auger attachment, as required. For example, each of the rotation of the auger 30 and auger attachment 10 could be driven by the drive of the operator vehicle 40 or they could have their own motors, such as hydraulic or electric motors. At least one arm can be provided as a mechanism that allows that rotation. For example, an arm can be rotatably configured between the frame and the auger attachment 10 to support the weight of the auger attachment 10 and permit rotation of the auger attachment 10 relative to the frame 42. In an aspect, the motor drive for the horizontal rotation of the auger attachment 10 about a vertical axis is mounted to the frame 42 so as to allow the auger attachment 10 to rotate relative to the frame 42.

The ability of the auger attachment 10 and frame 42 to be pivoted upward and downward relative to the operator vehicle 40 as a result of the boom 44 allows the beltline cleaner apparatus 100 easier maneuverability over rough or uneven terrain and may allow it to be portable and can be taken to any space requiring clearing. When the apparatus 100 is in transport and not being used to convey material, the auger attachment 10 and frame 42 can be pivoted upward so as to avoid bumping into upward inclines and obstacles low to the ground. This upward-pivoted position can be used for transport, and also storage and other operations.

The ability of the auger attachment 10 to be rotated about a pivot point on the frame 42 also allows for easier maneuverability in transporting the beltline cleaner apparatus 100 in narrow confines, around corners and in general confinement, oftentimes found in underground mining environments. In order to maneuver these spaces, the beltline cleaner apparatus 100 must be narrow enough to meet traffic or navigate through these environments. Allowing the auger attachment 10 to be rotated so as to be substantially parallel to the vehicle 40 allows for a narrowing of the entire frame of the beltline cleaner apparatus 100, which can make it easier for an operator to navigate the apparatus 100 around obstacles in confined environments.

In operation, the apparatus 100 may be taken or self-propelled to the location or area to be cleared. In some aspects, the area to be cleared will be an area having material build-up under a hanging conveyer belt. In further aspects, the area to be cleared will be an area with potash buildup in a potash mine shaft. The operator vehicle 40 can be situated alongside the area to be cleared. The auger attachment 10 and frame 40 can be lifted by the operator vehicle 40 operating the boom 44 and put in position next to a ground surface to be cleared, such as the ground below a conveyor belt. The auger attachment 10 could be in a configuration that is either parallel or perpendicular to the vehicle 40 when the attachment 10 and frame 40 are either lifted or lowered by the boom 44. The auger attachment 10 can be aligned so as to come into contact with material to be cleared when the attachment 10 is pivoted into place with the distal end 24 of the beam 20 over the area to be cleared. If the accumulation of material to be cleared is very high, the attachment 10 can be lifted for operation, and if the material to be cleared is very low to the ground, the attachment 10 can be lowered for operation. Once in position, the auger attachment 10 can be rotated so as to be substantially perpendicular to the operator vehicle 40, with the distal end 24 of the beam 20 pivoting to the area to be cleared. It is of note that the auger 30 may rotate while the auger attachment 10 is pivoting into place to allow for efficient movement of material, as described in more detail below.

With the distal end 24 of the beam 20 in contact with the material to be cleared, the auger 30 can be rotated. Rotation of the blade assembly or auger 30 allows the auger 30 to engage in the material to be cleared and conveys the material toward the radial direction of the auger 30, which happens along the auger 30 from the distal end 24 toward the proximal end 22.

In an aspect, the frame 42 can pivot the auger attachment 10 including the drive motor in order to clear obstacles under the beltline or other areas with low vertical clearance. The drive motor for rotating the auger 30 could be could be disposed on the beam 20, so long as the drive motor pivots with the auger attachment 10. There may be a set of tracks for structural integrity to allow the auger 30 to rotate while the auger attachment 10 is pivoted into place. For example, there could be two tracks welded into place with rollers that roll in the encapsulated track to give stability to the distal end 24 of the beam 20. While actuating into place, there could be two pins that hold the auger attachment 10 into place for structural integrity. In this way, the auger attachment 10 un-pins from the frame 42 and pivots by utilizing a set of tracks and rollers fitted to the proximal end 22 of the beam 20 to provide torsional support to the auger attachment 10 while it is pivoting. When the attachment 10 is to be reinserted under the beltline or other area with low vertical clearance, the area is often completely obstructed by the pile of potash fines or other material to be moved. Thus, the auger 30 must be capable of rotating while being inserted into the accumulated material under the beltline or other object. As the auger 30 pivots under the object, it can pull material such as potash out from under the beltline or other object to create sufficient space for the auger attachment 10 to pivot into place under the beltline or other low-clearance object. In this way, the drive system for the auger 30 pivots with the entire auger attachment 10 so that it can be operational throughout the pivoting procedure. The torsional loads while pivoting can be controlled with the track and roller assembly attached to the proximal end 22 of the beam 20.

In the aspect shown, the vehicle 40 moves rearward along the length of the area to be cleared. An operator moves the operator vehicle 40 and auger attachment 10 in a direction parallel to or alongside a longitudinal axis of the area being cleared. As the projections 32 and/or flightings of the auger 30 come into contact with the material to be cleared, they can break up the material to be cleared and convey the material toward the proximal end 22. At the proximal end 22, the paddles 28 can push the conveyed material toward the clearance or opening 26 provided by the average upward radius of curvature of the proximal end 22 of the beam 20. The material conveyed by the auger 30 can escape through the clearance 26 as the operator vehicle 40 pulls the beam 20 backward. The movement of the material in this way can ensure that the material does not accumulate within the auger attachment 10. Any material that cannot pass through the clearance 26, for example, if there is too much material conveyed, will continue along past the proximal end 22 to the side of the attachment 10, with the proximal end 22 being designed so as not to impede the flow of excess material out that end 22. Much of the material conveyed will thus travel through the opening 26 and be left discharged and trailing in front of the auger attachment 10 and operator vehicle 40 and any remaining material will be left to the side of the attachment 10. The conveyance of material toward the operator vehicle 40 by mechanically pulling it out rather than pushing the material away from the vehicle 40 can allow the operator of the vehicle 40 to see where the material is being moved so as to avoid any hazards on the other side of, for example, a conveyor belt, as well as can allow the operator to monitor the material in front of him or her that has been cleared. The resulting fugitive material that has been cleared can then be either reclaimed or disposed of.

The ability of the auger attachment 10 and frame 42 to be pivoted upward and downward relative to the operator vehicle 40 allows the operator to use multiple passes of a given area at different levels. Thus, as material levels get lower, the operator can lower the auger attachment 10 so that the auger attachment 10 maintains contact with the material to be cleared until the mound of material to be cleared is low enough to the ground or disappears.

The ability of the auger attachment 10 to be rotated about a pivot point on the frame 42 allows for maneuverability around drive ends of conveyor belt systems. Typical drive ends of conveyor belt systems do not have sufficient clearance to get below them, so the auger attachment 10 allows an operator to rotate around the drive end of the conveyor belt system by making the auger attachment 10 take a parallel configuration relative to the vehicle 40, moving the vehicle 40 backward, and then rotating the auger attachment 10 back into or onto the pile or mound of material to be cleared. The type of obstacle presented by a typical drive end could also take the form of any other obstacle such as debris that may get in the way of the auger attachment's movement 10 rearward along the space to be cleared.

The belt cleaning apparatus 100 thus actively and mechanically pulls material to be cleared out from areas with low vertical clearance, rather than passively removing material or pushing material to an opposite side of the area to be cleared. The apparatus 100 can be operated while the conveyor belt system is in operation, and does not require any downtime in the conveyor belt system if the apparatus 100 breaks down.

While the aspect shown in the figures shows the auger attachment 10 extending leftward of the operator vehicle 40, in some aspects the auger attachment could extend rightward of the operator vehicle. Similarly, while the aspect shown in the figures shows the movement of the vehicle 40 in a rearward direction in the direction of the arrow shown in FIG. 8, with the auger attachment 10 extending forward of the operator vehicle 40, in some embodiments of the invention, the auger attachment may extend rearward of the operator vehicle 40 with the operator vehicle 40 moving in a forward direction and other appropriate modifications so as to make the apparatus work in substantially the same way as the embodiment shown in the figures. While this alternative embodiment is possible, such a configuration would not allow an operator of the vehicle 40 to easily monitor the movement of the auger attachment 10 and the material conveyed by the auger attachment 10.

Some additional aspects of the invention could comprise an assembly that allows the conveyed material to be picked up and placed back on the beltline through a vacuum mechanism or an additional auger mechanism that conveys the product back on top of the conveyance surface of the beltline. A further additional aspect could include a geometrical structure added to the backside of the beam 20 that is level with the auger attachment 10 and thus will fit under the beltline or other low clearance area. Such a structure could add to the structural integrity of the auger attachment 10, with a cross bar extending from the frame 42 to the additional support structure to support the support structure on the frame 42.

The present invention thus can provide for conveyance of material fines and heaves from under low clearance objects using active mechanical means to extract the material out. The apparatus 100 can be configured to move materials such as salt or potash from an area with a low vertical clearance to an area in front of the apparatus 100 as the apparatus 100 travels along the length of the area to be cleared.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A clearing apparatus for removing bulk materials from an area, the area having a low vertical clearance, the clearing apparatus comprising:
    an operator vehicle;
    horizontally-extending auger conveyor coupled to the operator vehicle, pivotable vertically in relation to the operator vehicle and rotatable substantially 90 degrees about a vertical axis of the auger conveyor; and
    a beam, the beam supporting the auger conveyor, the beam comprising a proximal end in front of the operator vehicle and a distal end,
    wherein the beam is configured to allow the auger conveyor to rotate and capture the materials from the area by confining the materials to a portion of the auger conveyor as the auger conveyor moves along a direction transverse to an axis of rotation of the auger conveyor.

2. The clearing apparatus of claim 1 wherein the proximal end of the beam has an average upward radius of curvature, whereby when the distal end of the beam is substantially flush with the ground, there remains an opening between the beam and the ground adjacent the proximal end of the beam.

3. The clearing apparatus of claim 1 further comprising a drive motor for horizontal rotation of the auger conveyor, the drive motor disposed adjacent the proximal end of the beam.

4. The clearing apparatus of claim 1 further comprising projections on at least a portion of the auger fighting.

5. The clearing apparatus of claim 4 wherein the projections are at least partially composed of carbide.

6. The clearing apparatus of claim 1 wherein direction of rotation of auger fighting and direction and pitch of the auger flighting are configured to convey material toward the proximal end of the beam.

7. The clearing apparatus of claim 2 further comprising paddles disposed on the auger adjacent the proximal end of the beam, wherein when the auger is operating, the paddies are configured to sweep materials behind the proximal end of the beam through the opening between the beam and the ground adjacent the proximal end of the beam to an area in front of the beam.

8. The clearing apparatus of claim 1 further comprising a boom connecting the operator vehicle and the auger conveyor that is pivotable in the vertical direction to allow the auger conveyor to pivot in the vertical direction.

9. The clearing apparatus of claim 8 wherein the operator vehicle is a telescopic handler and the boom is a telescopic boom.

10. The clearing apparatus of claim 1 wherein the auger conveyor is rotatable substantially 90 degrees about the vertical axis of the auger conveyor between positions substantially perpendicular and parallel to the vehicle.

11. A method of removing bulk materials from a surface area with a low vertical clearance comprising the steps of:
prov255ding a horizontally-extending auger conveyor;
providing a beam configured to allow the auger conveyor to rotate and capture the materials from the area by confining the materials to a portion of the auger conveyor as the auger conveyor moves along a direction transverse to the axis of rotation of the auger conveyor;
moving the horizontally-extending auger conveyor over the surface area by operating an operator vehicle;
operating the auger conveyor flighting to cause movement of the materials from the surface area to an area in front of the operator vehicle;
moving the auger conveyor along a direction transverse to an axis of rotation of the auger conveyor; and
rotating the auger conveyor substantially 90 degrees about a vertical axis of the auger conveyor between positions substantially perpendicular and parallel to the operator vehicle.

12. The method of claim 11 wherein the steps of moving the auger conveyor over the surface area and operating the auger conveyor flighting occur simultaneously.

13. The method of claim 11 wherein the steps of moving the auger conveyor over the surface area and operating the auger conveyor fighting occur in any order.

14. The method of claim 11 further comprising the step of pivoting the auger conveyor in a vertical direction in relation to the operator vehicle.

* * * * *